United States Patent [19]

Murty

[11] Patent Number: 4,544,868
[45] Date of Patent: Oct. 1, 1985

[54] BRUSHLESS DC MOTOR CONTROLLER

[75] Inventor: V. Balarama Murty, Sterling Heights, Mich.

[73] Assignee: General Motors Corporation, Detroit, Mich.

[21] Appl. No.: 633,053

[22] Filed: Jul. 20, 1984

[51] Int. Cl.⁴ .............................................. H02P 6/02
[52] U.S. Cl. .................... 318/254; 318/138; 318/439; 318/811
[58] Field of Search ............. 318/138, 254, 318, 439, 318/599, 811, 289

[56] References Cited

U.S. PATENT DOCUMENTS

| | | | |
|---|---|---|---|
| 4,107,593 | 8/1978 | Anderson | 318/685 |
| 4,250,435 | 2/1981 | Alley et al. | 318/138 |
| 4,270,074 | 5/1981 | Duckworth et al. | 318/254 |
| 4,368,411 | 1/1983 | Kidd | 318/254 |
| 4,429,262 | 1/1984 | Utenick | 318/254 |
| 4,463,291 | 7/1984 | Usry | 318/254 |
| 4,490,661 | 12/1984 | Brown et al. | 318/254 X |
| 4,494,051 | 1/1985 | Bailey | 318/254 |

Primary Examiner—William M. Shoop, Jr.
Assistant Examiner—Bentsu Ro
Attorney, Agent, or Firm—Mark A. Navarre

[57] ABSTRACT

The voltage supplied to the stator windings of a brushless DC motor is pulse-width-modulated by a circuit which interrupts the energization thereof for a predetermined period of time whenever the DC line current supplied thereto exceeds a current reference. The frequency and off/on duty cycle of the applied voltage is relatively high near zero speed to produce smooth motor starting torque and decreases with increasing motor speed. The pulse-width-modulation effects regenerative braking whenever the stator winding energization sequence is changed to reverse the direction of motor rotation.

3 Claims, 15 Drawing Figures

BRUSHLESS DC MOTOR CONTROLLER

This invention relates to the control of a DC brushless motor and more particularly to a motor controller which provides smooth acceleration from zero speed and regenerative braking when it is desired to reverse the direction of motor rotation.

BACKGROUND OF THE INVENTION

Although the conventional DC motor is ideally suited from the control point of view for reversible variable speed applications, it suffers from a number of operational disadvantages, the major ones of which are directly attributable to its commutator and brushes. Not only do the brushes require periodic maintenance, but in low voltage applications (automotive, for example), the voltage drop across the brushes significantly reduces the maximum voltage available for the motor windings. Such disadvantages may be avoided through the usage of a synchronous, or brushless DC, motor. In the brushless DC motor, the rotor field is generated with permanent magnets, and the stator field is generated by sequentially energizing a plurality of stationary windings. In lieu of the brushes and commutator, the brushless DC motor requires a rotor position sensor, additional power electronics, and a logic circuit for suitably energizing the stator windings. In addition, some control device such as an input chopper or a pulse-width-modulation circuit, must be used to control the applied voltage and attain smooth acceleration when starting from zero speed.

SUMMARY OF THE INVENTION

This invention is directed to an improved brushless DC motor controller which is simple to mechanize and which yields substantially optimum motor winding energization for the production of smooth starting torque. The winding energization pattern is determined by a rotor position sensor and a logic mechanism responsive thereto. In the illustrated embodiment, the rotor position sensor is mechanized with three Hall sensors situated in the magnetic field of the motor rotor, and the logic unit is mechanized with a semiconductor read-only-memory (ROM) or programmable logic array (PLA). The sensor outputs address the ROM, and rotor position dependent winding energization patterns previously stored in the ROM are applied to driver circuits for energizing the motor windings. The optimum winding energization is achieved according to this invention with a novel pulse-width-modulation circuit which monitors the current supplied to the motor (DC line current) and interrupts motor energization for a predetermined period of time when such current rises above a reference level. Since the level of back-EMF in each motor winding is a function of motor speed, the motor energization period (the time taken for the DC line current to reach the reference level after each interruption) is a function of motor speed. The energization period is relatively short when the motor speed is low, and relatively long when the motor speed is high. The predetermined period of motor energization interruption is chosen such that the motor current cannot fall to zero. Since the period of interruption is fixed, the frequency of motor energization is also affected by motor speed. The energization frequency is relatively high at low motor speeds and relatively low at high motor speeds. As a result the motor energization frequency and period are substantially optimum for the production of smooth motor starting and running torque. In the illustrated embodiment, the output of the pulse-width-modulation circuit is applied to one of the address inputs of the ROM, and the ROM is operative to interrupt motor energization for the period indicated by the pulse-width-modulation circuit.

According to a further aspect of this invention, the pulse-width-modulation circuit is used to provide regenerative braking when the direction of motor rotation is to be reversed. In the illustrated embodiment, a forward/reverse input is applied to a further address input of the ROM, and the ROM is effective when such input changes state to change the sequence of motor winding energization so as to cause the applied voltage to aid the motor back-EMF. As a result, the DC line current rapidly rises above the reference current level, causing the pulse-width-modulation circuit to energize and deenergize the motor windings at a relatively high frequency. At each deenergization, the inductive energy stored in the respective motor windings is returned to the source, effecting regenerative braking of the motor until rotation is stopped. Thereafter, motor rotation in the opposite direction takes place automatically, with no logic change being required at zero speed.

IN THE DRAWINGS

Figure 1:
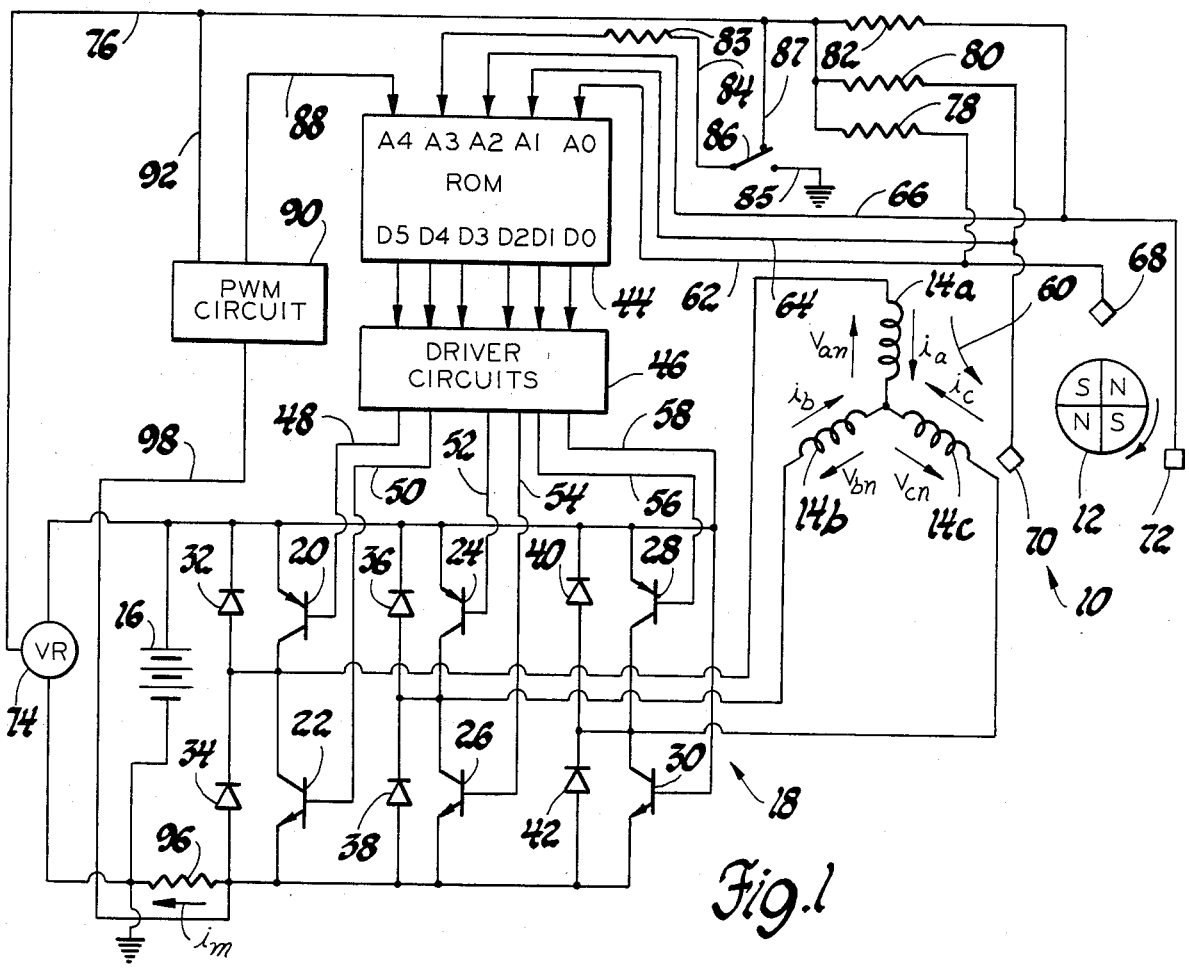
FIG. 1 is a block diagram of a brushless motor control system according to the preferred embodiment of this invention.

Referring now more particularly to FIG. 1, reference numeral 10 generally designates a brushless DC motor, comprising a permanent magnet rotor 12 and three star-connected stator windings 14a, 14b and 14c. The stator windings 14a–14c are adapted to be energized with current from the battery 16 through the full-wave bridge inverter 18. The bridge comprises six power transistors 20, 22, 24, 26, 28 and 30 connected in the conventional bridge configuration, and a freewheeling diode 32, 34, 36, 38, 40 and 42 connected across the emitter-collector junction of each such transistor. The winding energization is controlled by the read-only-memory (ROM) or programmable logic array (PLA) 44 which directs the driver circuit 46 via the data lines D0–D5 to supply drive current to the various bridge transistors via the lines 48, 50, 52, 54, 56 and 58. Thus, when the data lines D0 and D5 are at a logic 1 voltage level, the driver circuit 46 biases the transistors 20 and 30 conductive via lines 48 and 58 to energize the motor windings 14a and 14c with current in the direction indicated by the arrow 60. When the voltage on the data lines D0 and D5 falls to a logic zero level, the motor energization through transistors 20 and 30 is interrupted, and inductive energy stored in the motor windings 14a and 14c is returned to the battery 16 through the freewheeling diodes 34 and 40. The other bridge transistors are similarly controlled by the data lines of ROM 44 to produce different motor energization patterns.

The logic level present at the data lines D0–D5 of ROM 44, and hence, the motor winding energization pattern, is controlled as a function of the logic level of the five ROM address inputs A0–A4. The inputs A0, A1 and A2 are obtained directly via lines 62, 64 and 66 from the sensors 68, 70 and 72, which are situated 120 electrical degrees apart in the magnetic field of the motor rotor 12 and which provide an indication of the rotor position. In the illustrated embodiment, the sensors 68, 70 and 72 are of the Hall Effect type; however, sensors of another type or any rotor position encoder could be used. The sensors 68, 70 and 72 are normally in a high impedance state and toggle to a low impedance state when the motor rotor is in a predetermined position. The voltage regulator 74 provides a reduced voltage supply on line 76, and the pull-up resistors 78, 80 and 82 connect the line 76 to the address input lines 62, 64 and 66, respectively. Thus, the address inputs A0, A1 and A2 are normally held at a logic one voltage level and fall to a logic zero voltage level when the respective sensor 68, 70, or 72 is toggled to its low impedance state.

The input A3 of ROM 44 is obtained via resistor 83 and line 84 from the forward/reverse switch 86. When the switch 86 is in the shown position, the input A3 is connected to the supply line 76 via line 87, indicating that forward motor rotation is desired. When the switch 86 is moved to the opposite position, the input A3 is connected to ground potential via line 85, indicating that reverse motor rotation is desired. Of course, a further input could be provided for indicating that the motor is to be maintained off, or deenergized.

The input A4 of ROM 44 is obtained via line 88 from the pulse-width-modulation (PWM) circuit 90. The PWM circuit 90 is connected to the line 76 via the line 92. The shunt resistor 96 is connected in series between the battery 16 and the inverter 18, and the line 98 connects the inverter side of the shunt resistor 96 as an input to PWM circuit 90. As will be understood by those skilled in the art, the voltage across shunt 96, and hence, the voltage on line 98 is directly proportional by a known factor to the current supplied to motor 10 by battery 16. Such voltage is referred to herein as the DC line current signal. The PWM circuit 90 is described in detail below in reference to FIGS. 3 and 4.

Figure 2:
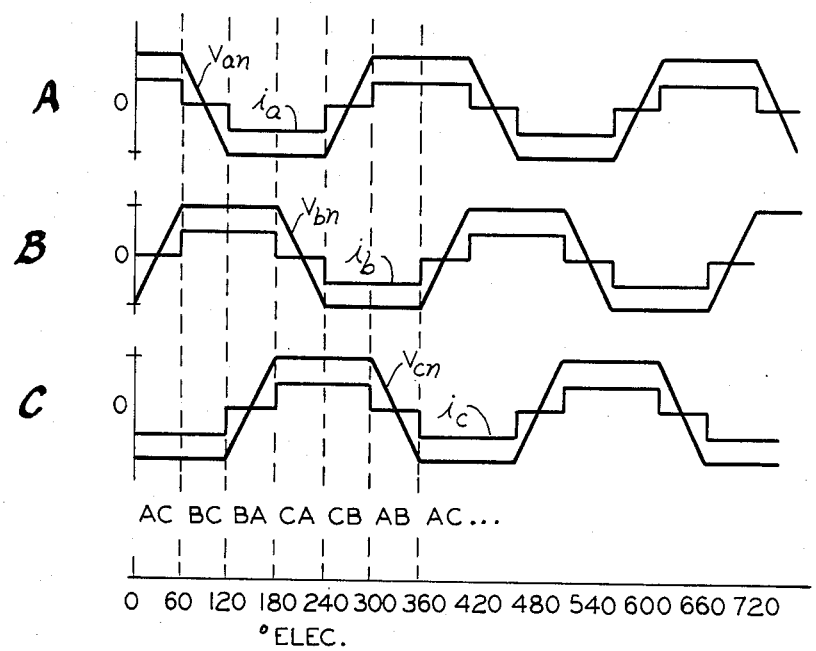
FIGS. 2A–2C are graphs depicting idealized phase voltage and phase current waveforms for each of the motor windings.

FIGS. 2A–2C depict idealized voltage and current waveforms as a function of rotor position for the stator windings 14a–14c during forward motor rotation. FIG. 2A depicts the phase voltage $V_{an}$ and phase current $i_a$ for the phase winding 14a; FIG. 2B depicts the phase voltage $V_{bn}$ and the phase current $i_b$ for phase winding 14b; and FIG. 2C depicts the phase voltage $V_{cn}$ and the phase current $i_c$ for phase winding 14c. Since the bridge transistors 20–30 are rendered conductive two at a time as described above in reference to FIG. 1, six different stator winding energization patterns are possible. Such patterns are designated herein as AC, AB, CA, CB, BA and BC. The first designation letter refers to the stator winding (14a, 14b or 14c) connected through a bridge transistor to the positive terminal of battery 16 and the second designation letter refers to the stator winding connected through a bridge transistor to ground potential. Each stator winding energization pattern produces a distinct stator magnetic field, and the conduction of the various bridge transistors is controlled by ROM 44 and the rotor position sensors 68–72, such that the magnetic axis of the stator maintains a predetermined relationship with respect to the magnetic field of the rotor. More particularly, the stator winding energization patterns are selected so that the magnetic axis of the stator leads the rotor field axis by between 60 and 120 electrical degrees, the motor torque thereby produced being maximum when the phase difference is 90 electrical degrees. The information for maintaining this sequence is obtained from the rotor position sensors 68–72 which, due to their orientation with respect to the rotor magnetic field, indicate six distinct regions of rotor position. If the forward direction of motor rotation is defined as being clockwise, the correct stator winding energization pattern sequence is AC, BC, BA, CA, CB and AB. Each such stator winding energization pattern is maintained for 60 electrical degrees of rotor rotation, as indicated in FIG. 2, and the patterns taken together occupy 360 electrical degrees or one complete cycle of stator winding energization. As an illustration of the graphs of FIG. 2, the stator winding energization pattern AC produces positive phase voltage ($V_{an}$) and phase current ($i_a$) in the winding 14a, and negative phase voltage ($V_{cn}$) and phase current ($i_c$) in the winding 14c. The subsequent stator winding energization pattern BC maintains the prior phase voltage and current in winding 14c and produces positive phase voltage ($V_{bn}$) and phase current ($i_b$) in the winding 14b.

Reverse motor rotation is obtained by providing the opposite stator winding energization pattern for a given rotor position. Thus, the stator winding energization pattern sequence for reverse motor rotation is CA, BA, BC, AC, AB and CB.

Figure 3:
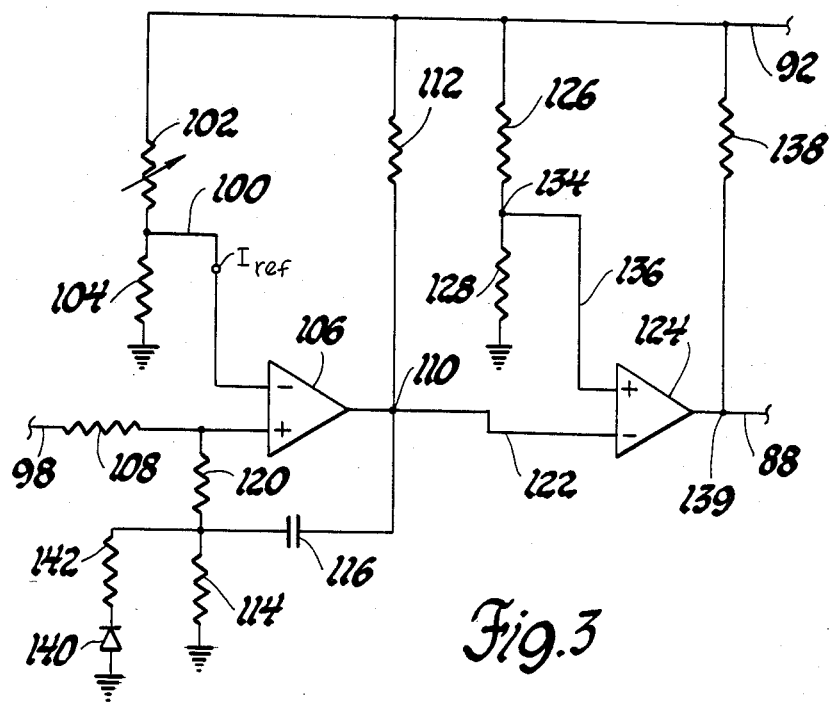
FIG. 3 is a circuit diagram of the pulse-width-modulation circuit depicted in FIG. 1.
Figure 4:
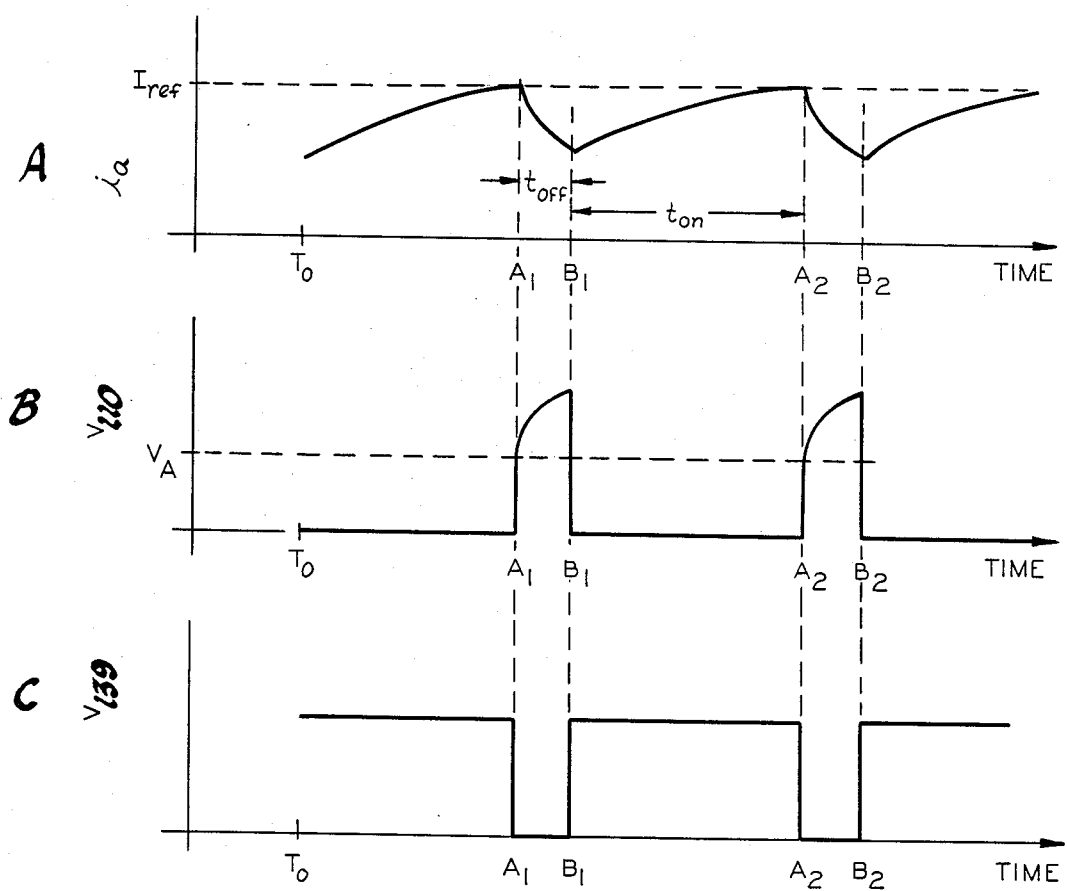
FIGS. 4A–4C are graphs depicting various waveforms occurring in the pulse-width-modulation circuit of FIG. 3.

The energization patterns described above are pulse-width-modulated by the pulse-width-modulation circuit 90 which is shown in detail in FIG. 3. Referring now more particularly to that figure, it will be seen that the conductors common to FIGS. 1 and 3 have been assigned the same reference numerals. Thus, the conductor 88 connects the PWM circuit 90 to the address input A4 of ROM 44, the conductor 92 connects the PWM circuit 90 to the supply voltage present in line 76, and the conductor 98 connects the PWM circuit 90 to the inverter side of the shunt 96. Functionally, the PWM circuit 90 operates to establish a reference voltage corresponding to a reference DC line current and to disable energization of the motor windings for a predetermined period of time whenever the actual DC line current exceeds the reference DC line current. The reference voltage is established on line 100 by a voltage divider comprising the resistors 102 and 104. Preferably, the voltage reference is adjustable, either by the variable resistor 102 as shown, or by a closed-loop motor speed control circuit (not shown) as will later be explained. The reference voltage on line 100 is connected to the inverting input of comparator 106. The voltage on line 98 is representative of the actual DC line current and such voltage is applied through input resistor 108 to the noninverting input of comparator 106. So long as the actual DC line current stays below the reference current, the comparator 106 is biased to its low impedance state maintaining its output terminal 110 substantially at ground potential. When the DC line current rises above the reference current, however, the comparator 106 is biased to its high impedance state and the voltage at the terminal 110 rises at once to a voltage determined by the relative resistances of resistors 112 and 114. Thereafter, capacitor 116 charges toward the supply voltage on line 92 through the resistors 112 and 114, and the noninverting input of comparator 106 is maintained at a relatively high voltage potential through the resistor 120. Thus, the comparator 106 cannot change states while the capacitor 116 is charging even though the voltage on line 98 falls below the reference voltage level.

The terminal 110 is connected via line 122 to the inverting input of comparator 124. A voltage divider comprising the resistors 126 and 128 defines a reference voltage at terminal 134 and such reference voltage is applied via line 136 to the noninverting input of comparator 124. The pull-up resistor 138 normally maintains the voltage potential at the comparator output terminal 139 at a relatively high level and the comparator 124 is effective when the voltage at terminal 110 rises above the reference voltage at terminal 134 to lower the voltage potential at terminal 139 to substantially ground potential. As indicated earlier, the voltage at terminal 139 is applied via line 88 to the A4 address input of ROM 44 for the purpose of controlling the stator winding energization. Whenever the voltage applied to the A4 address input of ROM 44 falls to a logic zero voltage potential, the bridge transistors 20–30 are all biased nonconductive to interrupt the stator winding energization. When the A4 address input of ROM 44 is returned to a logic 1 voltage potential, the normal energization pattern based on rotor position is resumed.

Figure 6:
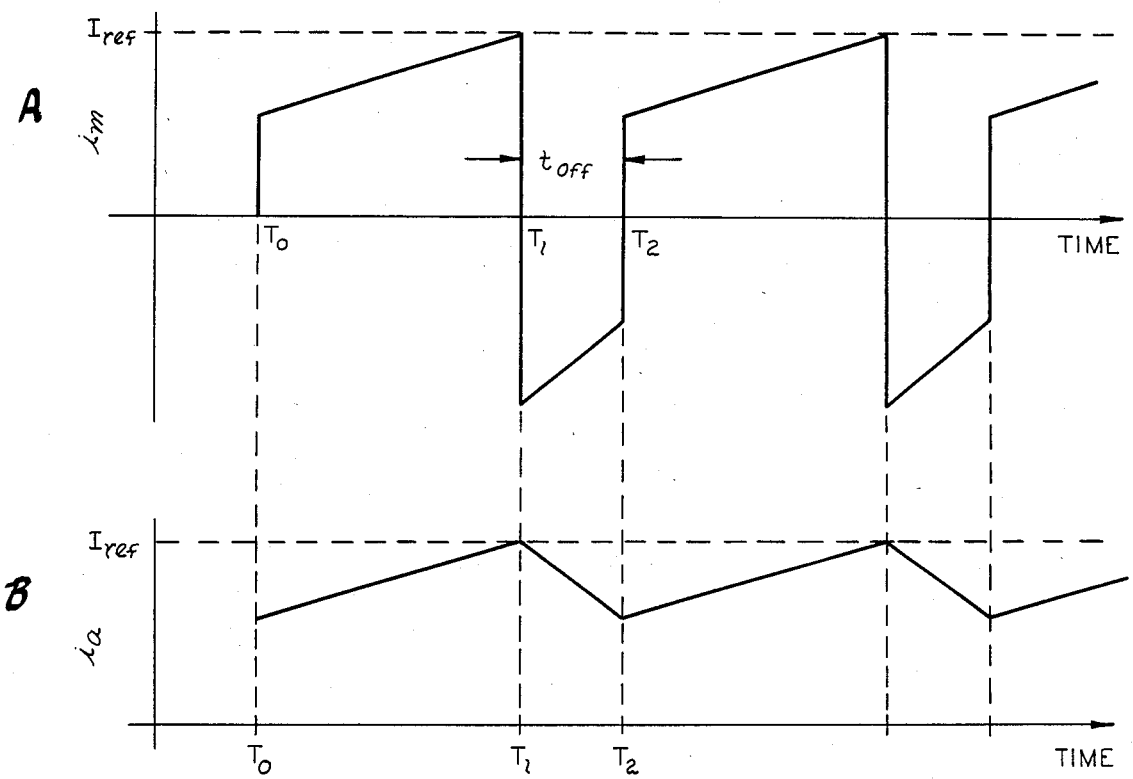
FIGS. 6A–6B depict the source and motor winding current waveforms on an expanded time scale.

The graphs of FIGS. 4A–4C depict the operation of the PWM circuit 90. FIG. 4A depicts the winding current $i_a$; FIG. 4B shows the voltage $V_{110}$ present at the terminal 110 of the PWM circuit 90; and FIG. 4C depicts the voltage $V_{139}$ present at the terminal 139 of PWM circuit 90. Beginning at a point in time designated $T_0$ in the graphs, a pair of bridge transistors are biased into conduction according to the stator winding energization pattern AC stored in ROM 44 to connect the battery 16 across the field windings 14a and 14c. The current therethrough as measured at the current shunt 96 increases toward the reference current $I_{ref}$ as seen in FIG. 4A until the reference current $I_{ref}$ is reached at time $A_1$. Prior to time $A_1$, the output of comparator 106 at terminal 110 is maintained substantially at ground potential as seen in FIG. 4B and the output of comparator 124 at terminal 139 is maintained substantially at the supply voltage as seen in FIG. 4C. At point $A_1$, however, comparator 106 changes state and the voltage at terminal 110 rises at once to the potential $V_A$ as defined in FIG. 4B. Thereafter, capacitor 116 charges toward the supply voltage through resistors 112 and 114, causing the voltage at terminal 110 to increase toward the supply voltage as seen in FIG. 4B. In response to the abrupt rise in the voltage at terminal 110, the comparator 124 also changes states and its output at terminal 139 is lowered to substantially ground potential as seen in FIG. 4C. As explained above, the terminal 139 is connected via line 88 to the A4 address input of ROM 44, and the ROM 44 is effective when the voltage applied to such address input falls to a logic zero voltage potential to interrupt the energization of the stator windings 14a and 14b. As a result, the current $i_a$ falls toward zero as seen in FIG. 4A. During such time, the voltage across shunt 96, and hence the voltage on line 98, actually becomes negative due to the return of inductive energy to battery 16 as explained above in reference to FIG. 1 and below in reference to FIG. 6. During such time, the capacitor charging current through resistor 114 creates a positive voltage which is applied through resistor 120 to the noninverting input of comparator 106 to maintain the comparator 106 in its high impedance state even though the current $i_a$ falls below the reference current $I_{ref}$. At time $B_1$, however, the charging current is reduced substantially to zero and the comparator 106 changes state as seen in FIG. 4B due to the reduced level of the current $i_a$. In response thereto, capacitor 116 discharges through diode 140, resistor 142 and comparator 106. In addition, the comparator 124 returns to its high impedance state as seen in FIG. 4C. When the voltage at terminal 139 returns to its normal logic 1 voltage potential at time $B_1$, the ROM 44 is effective to reenergize the stator windings 14a and 14b. At such point, the current $i_a$ begins to increase as seen in FIG. 4A until it again exceeds the reference current $I_{ref}$ at time $A_2$, whereupon the above-described process is repeated.

The above-described turning on and off motor current effectively pulse-width-modulates the stator winding energization. The time interval $t_{off}$ between times $A_1$ and $B_1$ as defined in FIG. 4A is fixed and determined as explained above, by the RC time constant of resistors 112 and 114 and capacitor 116. According to this invention, such circuit elements are chosen to provide a turn-off period ($t_{off}$) short enough to prevent the motor current from falling to zero. It will be appreciated that such time may be chosen as a function of the reference current level $I_{ref}$ and the L/R time constant of the motor stator windings. On the other hand, the time interval $t_{on}$ between times $B_1$ and $A_2$ as defined in FIG. 4A, is variable as a function of the motor back-EMF. If the motor speed is high, the back-EMF is also high and the time interval $t_{on}$ is relatively long. If the motor speed is low, the back-EMF is also low, and the time interval $t_{on}$ is relatively short. Thus, low motor speeds result in a relatively low on/off duty cycle of pulse-width-modulation, while high motor speeds result in a relatively high on/off duty cycle of pulse-width-modulation.

The relationship between motor speed and the stator winding current is graphically depicted in FIGS. 5A–5C, where FIG. 5A depicts relatively low motor speed (680 rpm), FIG. 5B depicts medium motor speed (975 rpm), and FIG. 5C depicts relatively high motor speed (1335 rpm). Each of the graphs depict a stator winding current $i_a$ as a function of time and thus relate directly to the idealized trace of $i_a$ depicted in FIG. 2. The discontinuity at the center of each energization polarity corresponds to an energization pattern change such as from AB to AC or from BA to CA.

Figure 5:
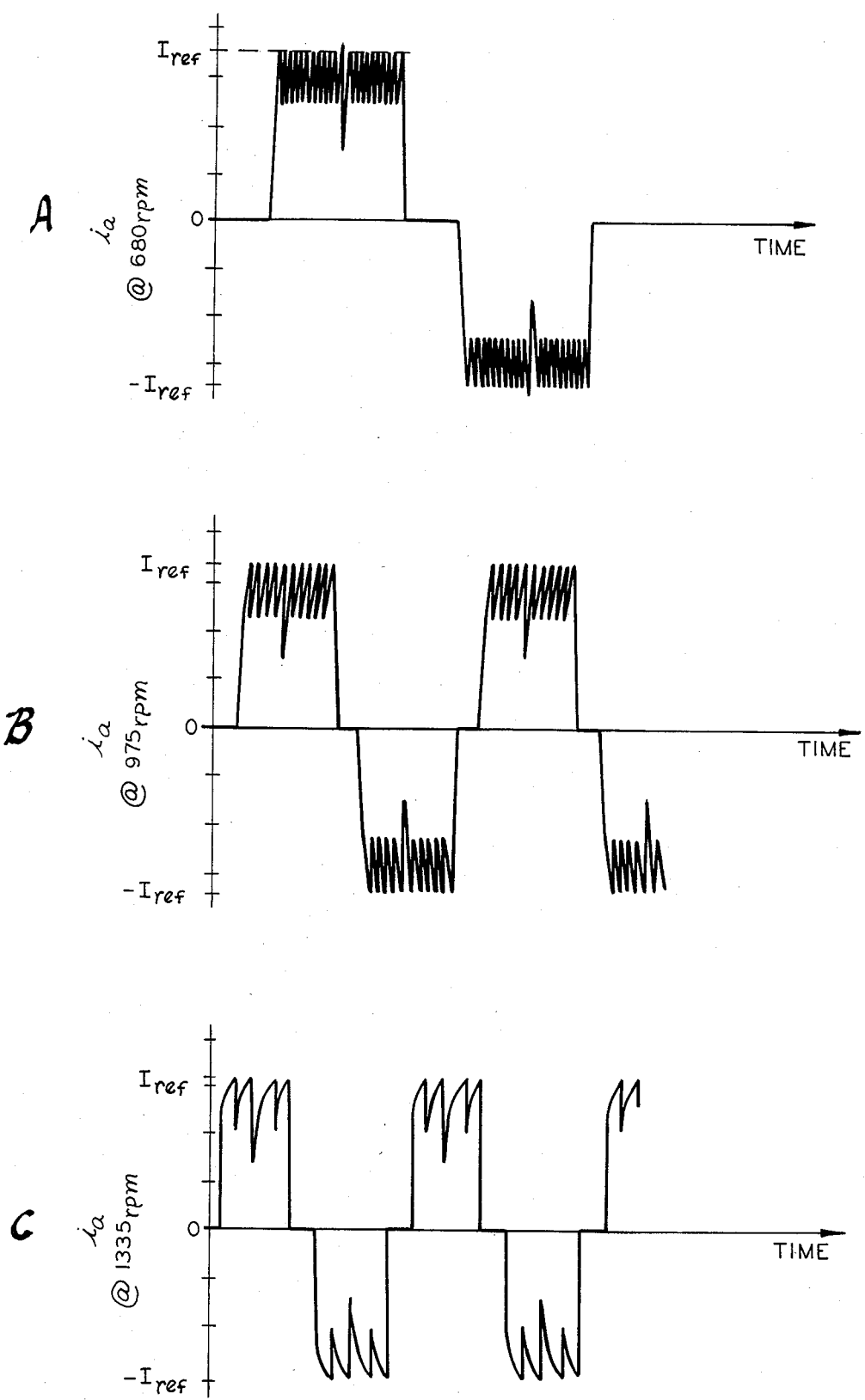
FIGS. 5A–5C depict the current in a motor winding as a function of time for low, medium and high motor speeds, respectively.

Significantly, FIG. 5 shows that the energization frequency and the off/on duty cycle of pulse-width-modulation decreases with increasing motor speed, yielding substantially optimum energization for the production of smooth motor torque. Moreover, at very low speeds near starting, the current ripple due to the pulse-width-modulation is the least and the waveform is nearly rectangular. Since the back-EMF at such low speeds is trapezoidal in form for a permanent magnet machine, the torque per ampere should be maximum and the utilization of the machine magnetic and electric circuits should be substantially optimum. In other words, the performance should substantially equal that of a conventional DC machine in which the induced EMF and current are of the same form.

The inductive energy return to battery 16 occurring at the end of a winding energization pattern, as described above with reference to FIG. 1, also occurs each time the PWM circuit 90 operates to interrupt the stator winding energization within an energization pattern. This operation is graphically depicted in FIGS. 6A and 6B where FIG. 6A depicts the DC line current as measured at shunt 96 with respect to time and FIG. 6B depicts the current $i_a$ as a function of time. Assuming an energization pattern of AB, the time $T_0$ corresponds to the point at which the bridge transistors 20 and 30 are rendered conductive by ROM 44 and the driver circuits 46. Thereafter, the current $i_a$ is equal to the DC line current. When the DC line current rises above the reference current $I_{ref}$ at time $T_1$, the PWM circuit 90 and ROM 44 operate to bias the bridge transistors 20 and 30 to their nonconductive states to interrupt energization of stator winding 14a. Thereafter, the inductive energy stored in the winding 14a is circulated through the battery 16 via the freewheeling diodes 40 and 34, resulting in negative battery current. At time $T_2$ the predetermind off time $t_{off}$ provided by the PWM circuit 90 expires and the transistors 20 and 30 are again biased conductive to connect battery 16 to the stator windings 14a and 14b, whereupon the cycle described above is repeated.

An important aspect of this invention resides in the provision of regenerative braking of the motor when it is desired to reverse the direction of motor rotation. Of primary importance in this respect is that no additional circuitry or logic elements are required, and no change in logic need be made at zero speed to begin motoring in the new direction. When the switch 86 is shifted from the forward position to the reverse position or vice versa, the energization patterns produced by ROM 44 on data lines D0–D5 are simply reversed as described above in reference to FIG. 1. Due to the reversal, the voltage applied to the stator windings by the battery 16 aids the back-EMF therein, causing the DC line current to rapidly increase to the reference level. As such, the PWM circuit 90 effects a relatively high frequency current oscillation in the windings 14a–14c. Each time the current is interrupted, a high energy pulse of current is returned to the battery 16 via the respective freewheeling diodes 32–42 as described above in reference to FIG. 6, thereby effecting relatively strong regenerative braking of the motor. As the motor slows the frequency of pulse-width-modulation increases until the motor slows to zero speed, whereafter it automatically accelerates in the opposite direction since the energization pattern sequence being produced by ROM 44 is correct for reverse motor rotation. In other words, the energization pattern sequence for forward braking is the same as for reverse motoring; likewise, the energization pattern sequence for reverse braking is the same as for forward motoring. This is an important aspect of the present invention and provides fast response in reversing since no logic change is needed at zero speed.

Figure 7:
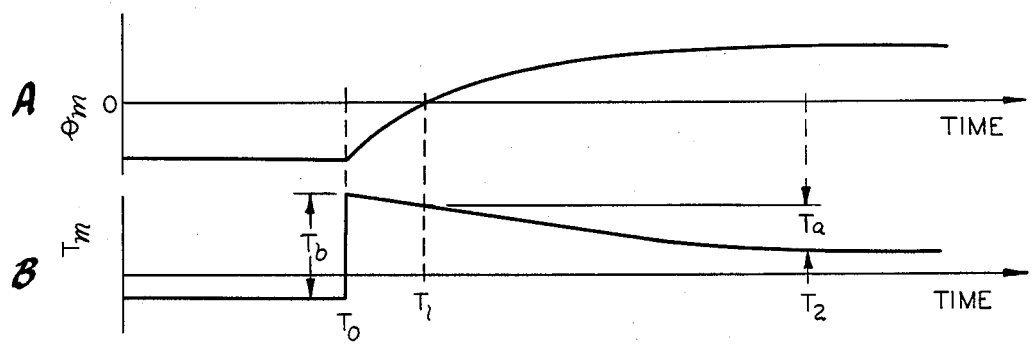
FIGS. 7A–7B depict the motor speed and torque as a function of time during a reversal of the direction of motor rotation.

FIG. 7 graphically illustrates the motor operation during reversal of motor direction. FIG. 7A depicts the motor speed $\phi_m$ as a function of time and FIG. 7B depicts the motor torque $T_m$ as a function of time. The motor speed and torque are defined as being negative for the initial direction of motor rotation shown in the figures. Prior to time $T_0$, the motor speed and torque are at their steady state values. At time $T_0$, the forward/reverse switch 86 is shifted, indicating that the opposite direction of motor rotation is desired. At such point, the stator winding energization patterns and sequence are reversed by ROM 44 and regenerative braking ensues. This produces a reversal of motor torque and a relatively high peak braking torque $T_b$ as shown in FIG. 7B. As the motor speed slows, the magnitude of the regenerative braking current and hence the motor braking torque decreases. When the motor speed reaches zero at time $T_1$, the motor torque becomes an accelerating torque $T_a$, accelerating the motor in the new direction. As the motor speed increases in the new direction, the back-EMF increases causing a corresponding decrease in the motor accelerating torque until at time $T_2$ the motor torque and speed reach their new steady state values.

Since the reference current $I_{ref}$ of the PWM circuit 90 determines the steady state level of stator winding current, there is a direct relation between the reference current $I_{ref}$ and the resulting steady state motor speed. Although the reference current has been described as "fixed" in the illustrated embodiment, it will be understood that its value may be varied (as with the potentiometer 102 in FIG. 3) to vary the steady state motor speed. Moreover, it will be understood that the controller of this invention may be used in conjunction with a proportional-integral (PI) or other such feedback controller to form a closed loop motor speed control system. In such an application, the output of the speed controller would be used to vary the value of the reference current. If the motor speed were too low, the reference current would be increased; if the motor speed were too high, the reference current would be decreased.

While this invention has been described in reference to the illustrated embodiment, it will be understood that various modifications or substitutions may be made without departing from the teachings of this invention. For example, the ROM or PLA 44 may be replaced with simple digital logic circuitry, if desired. In this regard, it will be understood that controllers incorporating such modifications or substitutions may fall within the scope of this invention which is defined by the appended claims.

The embodiments of the invention in which an exclusive property or privilege is claimed are defined as follows:

1. A drive circuit for a brushless DC motor having a permanent magnet rotor and a plurality of electrically energizable stator windings, comprising:

a source of direct voltage;

logic means responsive to the position of the motor rotor for indicating a stator winding energization pattern for producing motor rotation in a specified direction;

switching means for energizing said stator windings with said source according to the pattern indicated by said logic means, thereby to establish a winding current which increases at a rate determined according to the difference between the source voltage and the counter-EMF voltage induced in the winding due to motor rotation; and pulse-width-modulation means effective when the winding current exceeds a reference amount for interrupting the winding energization for a predetermined period of time, thereby to pulse-width-modulate the voltage applied to the motor windings at a frequency and off/on duty cycle which is relatively high near zero speed for producing smooth motor staring torque, and which automatically decreases with increasing motor speed in the specified direction.

2. A drive circuit for a DC motor as set forth in claim 1, additionally comprising:

means effective when it is desired to reverse the direction of motor rotation for causing said logic means to change the indicated stator winding energization pattern so that the voltage applied to said stator windings aids the voltage induced in said windings due to motor rotation, thereby causing the winding current to increase at a relatively high rate, said pulse width modulation means being effective under such conditions to automatically increase the frequency and off/on duty cycle of the voltage applied to said stator windings so that the energy stored therein upon interruption of the energization thereof is returned to the source in a series of current pulses to effect regenerative braking of the motor rotor until motor rotation is stopped, whereafter motor rotation in the reverse direction is automatically commenced.

3. A drive circuit for a brushless DC motor having a permanent magnet rotor and a plurality of stator windings, comprising:

a source of direct voltage;

logic means responsive to the position of the motor rotor and a direction signal corresponding to the desired direction of motor rotation for indicating a stator winding energization pattern for producing motor rotation in the desired direction;

switching means for supplying said stator windings with DC line current from said source in accordance with the pattern indicated by said logic means, said DC line current thereby increasing at a rate determined according to the difference between the source voltage and the counter-EMF voltage induced in the respective windings due to motor rotation;

pulse-width-modulation means effective when the DC line current exceeds a reference amount determined in relation to the desired steady state motor speed for interrupting the supply of current from said source for a predetermined period of time shorter than that required for the current in the respective windings to fall to zero, thereby pulse-width-modulating the voltage applied to the motor windings at a frequency and off/on duty cycle which is relatively high near zero speed for producing smooth motor starting torque, and which automatically decreases with increasing motor speed; and means effective when the direction signal indicates that a reversal of the direction of motor rotation is desired for causing said logic means to change the indicated stator winding energization pattern so that the voltage applied to said stator windings aids the voltage induced in said windings due to motor rotation, thereby causing the DC line current to relatively rapidly rise above the reference amount of said pulse-width-modulation means, so that the frequency and off/on duty cycle of the voltage applied to said stator windings is automatically increased and the energy stored therein at the interruption of the supply of current thereto is returned to the source in a series of current pulses to effect regenerative braking of the motor rotor until motor rotation is stopped, whereafter motor rotation in the reverse direction is automatically commenced without requiring a change in said logic means at zero motor speed.

* * * * *